April 22, 1924.
P. A. BLAIR
DETECTOR OF PROJECTILE PATHS
Filed Dec. 19, 1919
1,490,999
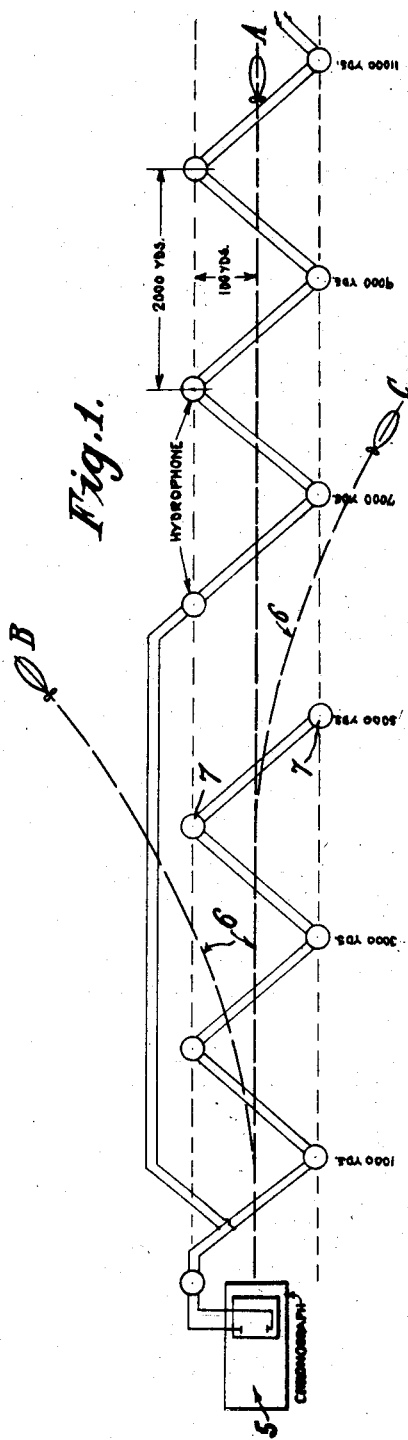
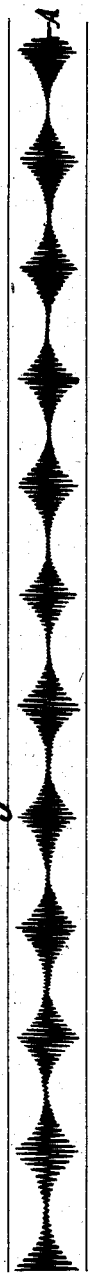
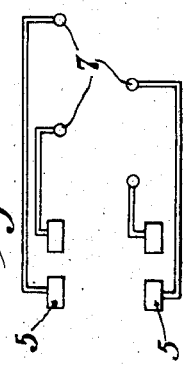
Inventor
P. A. Blair Patented Apr. 22, 1924.

1,490,999

UNITED STATES PATENT OFFICE.

PAUL A. BLAIR, OF WASHINGTON, DISTRICT OF COLUMBIA.

DETECTOR OF PROJECTILE PATHS.

Application filed December 19, 1919. Serial No. 346,175.

*To all whom it may concern:*

Be it known that I, PAUL A. BLAIR, a citizen of the United States, residing at Washington, District of Columbia, have invented new and useful Improvements in Detectors of Projectile Paths, of which the following is a specification.

This invention relates to a method and apparatus for detecting and recording the speed of a moving body and more particularly the speed and deflection of a torpedo from its intended course along a testing range.

The invention which will hereinafter be described with relation to its application to a torpedo testing range is to be considered as a modification of the device disclosed in the co-pending application of Jacob M. Cohen filed December 19, 1919, Serial No. 346,193 for method and apparatus of measuring the speed of torpedoes and for that reason no claim is made to the broad application of hydrophones, chronographs or similar instruments for this purpose.

Torpedo ranges are used primarily for the purpose of testing torpedoes after being manufactured and assembled with a view of determining their accuracy, durability and operativeness as a whole under conditions as nearly approximating those occurring in actual use as is possible. The torpedo is usually fired from a fixed point such as a float or specially constructed pier. The range which is preferably located in more or less protected waters and in a position parallel to the currents or tides, if any, flowing through said waters. Heretofore at regular intervals, for example, every thousand yards, a boat is stationed with an observer whose duty it is to locate and report the relative position of the torpedo as it passes his station as well as the time of such passage as nearly as can be determined from observation of the wake produced by the torpedo.

With this accumulated information from each boat or observation station located along the range an approximate record of the speed and course of the torpedo is obtained. This method, however, is open to certain objections such, for example, as the employment of a relatively large number of men, the difficulty of observation in cloudy or foggy weather and the practical impossibility of operation under severe atmospheric conditions.

One of the objects of the present invention is to provide a simple and practical means and method of operation adapted to overcome these and other objects and at the same time produce a very accurate record showing the complete run of the torpedo with respect to its speed, its deflection or its stoppage due to abnormal conditions.

A further object is to provide a device of the above character which may be easily and inexpensively installed and capable of being placed in operative condition at a moment's notice.

A further object is to provide a simple and practical method of operation for determining the speed, course and deflection of torpedoes while being tested.

While the invention will be hereinafter described more particularly with relation to its application to torpedoes on range tests it will, of course, be understood that without material modification the apparatus may be used in whole or in part for determining similar characteristics of other moving bodies.

The invention will hereinafter be described with relation to the annexed sheet of drawing illustrating one of various possible embodiments of the invention in which Figure 1 is a diagrammatic view showing such parts of one form of an apparatus as is necessary to fully understand the invention and enable one skilled in the art to construct and install the same.

Figures 2, 3 and 4 show diagrammatically record strips or curves produced by torpedoes following the lines A, B and C of Figure 1. Figure 5 shows the modification of the system used in Figure 1.

Referring to these drawings in detail, 5 denotes the sending station which may be a float or pier at one end of the course indicated by the dotted lines 6. These lines may be any convenient distance apart but it is believed that 100 yards to each side of the center line would probably be most desirable. Spaced apart and preferably equally along these boundary lines 6 are a plurality of hydrophones or other suitable sound receiving instruments 7 such as magnetophones, microphones, or the like and these hydrophones may be connected electrically in parallel in groups as indicated graphically with any desired form of receiving instrument or chronograph. It may be found desirable to have these hydrophones connected in parallel groups as shown in Figure 1, for according to the present state of development of this art difficulty has been experienced in connecting more than six or eight instruments and obtaining individual records. The chronograph may be omitted and each hydrophone provided with an independent receiver if desired as shown in Figure 5. These hydrophones are preferably located or anchored on the bottom of the course as they are found to work more satisfactorily in a denser medium and at this point they are also less affected by surface sounds and changes in atmospheric and temperature conditions. The hydrophones have their diaphragms preferably constructed of a material with those dimensions which will cause said diaphragms to have the same natural period of vibration as the vibrations produced by a moving torpedo. This can be easily determined by computation and experiment and, for example, an iron disk substantially 10 inches in diameter and 1 inch thick will have a natural frequency approximately the same as that produced by a torpedo.

It would also probably be desirable to mark the location of the hydrophones by floats attached to the anchors of the hydrophone.

The receiver or chronograph may also be of any desired type adapted to reproduce the vibrations of the hydrophone from which an accurate record thereof may be obtained either manually or automatically upon a moving film as shown in Figures 2, 3 and 4.

The several hydrophones should be tuned and adjusted to the same pitch and sensitiveness whereby the amplifications produced on the tape are substantially uniform for equal distances of the moving torpedo therefrom. Care should be taken that the sensitiveness is not so great as to cause an interference with the reception and recording of the sound waves by the next adjacent hydrophone. If such occurred individual receivers would overcome this objection.

In order to prevent possible interference of one microphone on adjacent microphones, it might possibly be necessary to connect the microphone to the receiving station by separate and independent circuits.

This idea would appear more clear from an analysis of Figure 2 wherein the amplifications appear on the tape opposite the corresponding hydrophone station and the intermediate portion of the curve is a little more than a straight line. If the amplifications of one should overlap those of another the result might be either to neutralize the curve entirely if the vibrations are opposed or to materially increase the vibrations if acting together thus producing a record which on its face might indicate a serious deflection of the torpedo from its course.

In Figure 3 there is shown the effect of a torpedo having a deflection to the left according to line B. This position of the torpedo could be easily plotted from this curve by noting the increase or decrease of normal amplification opposite the stations.

The curve shown in Figure 4 is intended to indicate the path produced by the torpedo following line C which abruptly leaves the course and stops due to flooding of the after-body, for example. Under such circumstances, the turbines are stopped and the torpedo sinks. This will enable the observers to locate very closely the resting place of the torpedo on the bottom of the course or adjacent thereto from which it could be raised and repaired.

The terms "hydrophone" and "chronograph" used in the claims are to include similar or equivalent instruments for accomplishing similar results.

From the above it will be seen that the present invention provides a simple and practical apparatus and method of use adapted to accomplish among others all of the objects and advantages herein set forth. The record strips which should be saved and numbered corresponding to the number of the torpedo will give an accurate history of its run thereby enabling the constructors to make such repairs or changes as may be necessary prior to its next test.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

What I claim is:—

1. The herein described method of determining the speed and deflection of torpedoes which consists in recording the amplifications of a series of hydrophones at opposite sides of the range and plotting from said amplifications the course of a torpedo along the range.

2. The herein described method of recording the speed and deflection of torpedoes which consists in recording amplifications of a series of hydrophones arranged in staggered relation along the opposite sides of a torpedo range and plotting the course of the torpedo from the degree of amplifications.

3. The herein described method of determining the speed and deflection of torpedoes which consists in noting the vibration of a plurality of sound receiving instruments arranged at opposite sides of and parallel to a testing range and plotting the speed and deflection of the torpedo from the noted vibrations.

4. In an apparatus of the character described, in combination, a plurality of hydrophones arranged in two parallel straight lines at opposite sides of the torpedo range, the hydrophones of one line being in staggered relation with respect to the hydrophones of the other line, a chronograph including a recording tape connected with said hydrophones adapted to indicate graphically upon said type and vibrations of each hydrophone as the torpedo passes adjacent thereto thereby to indicate the relative speed and deflection of said torpedo with respect to its straight line course.

Signed at Washington, District of Columbia, this tenth day of November, 1919.

P. A. BLAIR.